United States Patent [19]
Baumann

[11] Patent Number: 5,284,319
[45] Date of Patent: Feb. 8, 1994

[54] ECCENTRICALLY ROTATABLE SLEEVE VALVE

[76] Inventor: Hans D. Baumann, 32 Pine St., Rye, N.H. 03870

[21] Appl. No.: 109,245

[22] Filed: Aug. 20, 1993

[51] Int. Cl.⁵ .............................................. F16K 27/00
[52] U.S. Cl. ..................................... 251/251; 251/214; 251/331
[58] Field of Search ............... 251/251, 257, 258, 331, 251/304, 901, 214

[56] References Cited

U.S. PATENT DOCUMENTS

| | | | |
|---|---|---|---|
| 2,534,577 | 12/1950 | Courtot | 251/258 X |
| 2,812,154 | 11/1957 | Nordstrand | 251/251 |
| 2,948,504 | 8/1960 | Merrill | 251/258 |
| 3,186,681 | 6/1965 | Lowrey | 251/214 |
| 3,254,872 | 6/1966 | Roos | 251/214 X |
| 3,682,490 | 8/1972 | Lunt | 251/214 X |
| 4,510,966 | 4/1985 | Parsons, Jr. | 251/214 X |
| 4,535,803 | 8/1985 | Price | 251/214 X |
| 4,609,178 | 9/1986 | Baumann | 251/251 X |

Primary Examiner—Martin P. Schwadron
Assistant Examiner—Kevin L. Lee

[57] ABSTRACT

The Eccentrically Rotatable Sleeve Valve is comprised of a housing having a central, vertical bore retaining therein a flexible, tubular sleeve whose central portion can be eccentrically motivated towards or away from a valve seat which is located perpendicularly towards and at the center of said vertical bore, by a core element positioned inside said sleeve and which is capable of being radially displaced by a stem having eccentric cam means and wherein said sleeve is sealingly engaged towards the housing bore by internal, deformable rings motivated radially outwardly by an adjustable bonnet whose means of adjustments are elastically supported.

6 Claims, 1 Drawing Sheet

ECCENTRICALLY ROTATABLE SLEEVE VALVE

This application describes and claims further improvements over my co-pending application, Ser. No. 08/044,691, Filed on Apr. 12, 1993, Art Unit 3407.

BACKGROUND OF THE INVENTION

This invention relates to packless control valves used to control the flow of fluid in a piping conduit. A typical example of a packless valve that may be used for this purpose is a diaphragm type valve as illustrated, for example, in my U.S. Pat. No. 4,609,178. These valves provide good closure means and are reasonably compact. However, since the diaphragm acts both as a closure member and a stem seal, these diaphragms must be fairly large and are typically two to three times the diameter of the valve orifice. The result is a requirement for substantial actuating forces to overcome the forces created by the diaphragm area times fluid pressure. If the diaphragm is made out of a plastic, such as PTFE (Polytetrafluoroethylene), routine repeated closure of such a diaphragm is not guaranteed due to the high mechanical stress imposed upon by the large flexible movement required for such a diaphragm. Another disadvantage of a diaphragm valve is their highly streamlined flow passage which can lead to cavitation and wear under high fluid velocities. Finally, the body size of a typical diaphragm valve is fairly large in comparison to the port opening which makes the construction of such a valve fairly expensive. My invention overcomes these and other objections to valves of prior art by using a flexible tube as a closure element and stem sealing device. The flexible tube itself can be made from any commercial elastomeric or plastic, such as sanitary grade silicone rubber, without imposing undue stresses on the material. The relatively small amount of radial displacement of the sealing material requires only moderate actuating forces which leads to substantial cost savings as far as actuating devices are concerned. In comparison to diaphragm valves, which have relatively large areas subject to fluid pressure and, therefore, high stresses, my flexible tube is supported over more than 90% of the exposed area by an interiorly placed mechanical element resulting again in relatively low stress levels, thereby guaranteeing a substantially higher number of life cycles. Another advantage lies in the fact that my sealing tube diameter is only about 65% larger than the valve port diameter, therefore, requiring a relatively small valve housing and valve closure flanges. Finally, my invention provides for a valve that can be utilized in full vacuum without fear of the sealing membrane collapsing under a negative pressure gradient as is the case with typical diaphragm valves. These and other important advantages will be explained more clearly by the following drawings and descriptions.

DESCRIPTION OF THE INVENTION

While the invention will be described in connection with a preferred embodiment, it should be understood that there is no intention to limit the invention to this specific embodiment.

Figure 1:
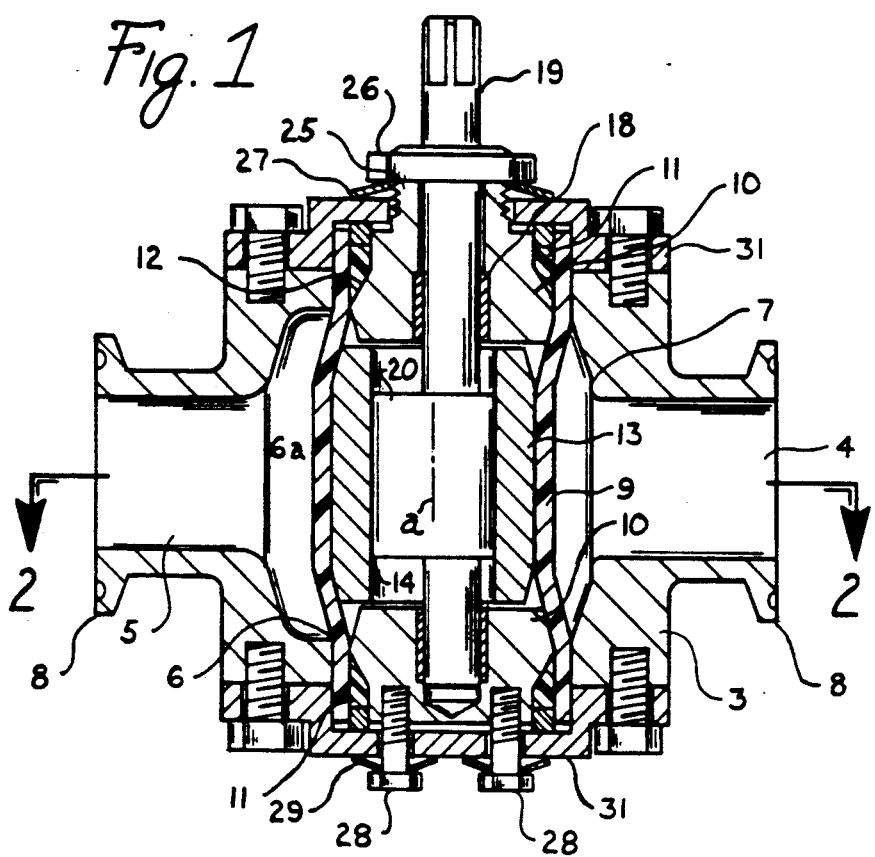
FIG. 1 is a vertical central, cross-sectional view of a preferred embodiment of my invention, where the valve is shown in the open position.

Referring to FIG. 1, my invention is comprised of the valve housing 3 having an inlet port 4 and an outlet port 5. It should be understood that in order to function properly, inlet port 4 and outlet port 5 could easily be reversed and that the choice of location is purely one out of convenience. Valve housing 3 has a central, circular, perpendicular bore 6 and an enlarged opening 6a where the intersection between inlet port 4 and opening 6a provides for a cylindrical sealing surface 7 constituting a valve seat. Inlet port 4 and outlet port 5 have a flanged structure 8 suitable to connect to a fluid containing piping system. Circular bore 6 contains within a flexible tube or sleeve 9 which fits snugly into circular bore 6 and which is supported in the inside by two inserts 10, the latter being held in place by an upper and lower bonnet flange 31. The central interior of sleeve 9 is occupied by a barrel-shaped element 13 having a hollowed center portion 14. Insert 10, furthermore, has a guide bushing 18 guiding therein a valve stem 19 which has a cylindrical central portion 20 whose center is off-set from the center of stem 19 by a distance "e" shown in FIG. 2. The upper extension of stem 19 is capable of engaging an actuator.

The outer sleeve 9 has to be compressed against the inner surface of bore 6 in order to prevent leakage of fluid from opening 6a to the outside. This is accomplished by using a wedge 11 made out of an elastomeric material and motivated outwardly by the chamfered portion 12 of inserts 10. In order to accomplish this compression, the upper insert 10 has a threaded extension 25 extending through an opening of upper bonnet flange 31 and motivated upwards by a threaded nut 26. While this works in service under relatively stable temperatures, there are applications such as in aseptic service where the temperature may rise periodically by over 200 degrees Fahrenheit due to the admission of sterilizing steam. Such temperature excursions can cause substantial thermal expansion of the elastomeric sleeve and wedge leading to permanent deformation and loss of sealing capability upon a subsequent cooldown of the valve. This is not permissible. However, I have found that by adding a spring member, such as a conical spring washer 27 under nut 26, I can restore the desired loading of wedge 11 even after repeated thermal cycling according to a principle that has been successfully employed for valve stem packings in the past.

More space permitting, I have replaced extension 25 and nut 26 with a number of bolts 28 and correspondingly smaller spring washers 29 at the lower portion of the bonnet flanges 31 while achieving the same desired results.

Figure 2:
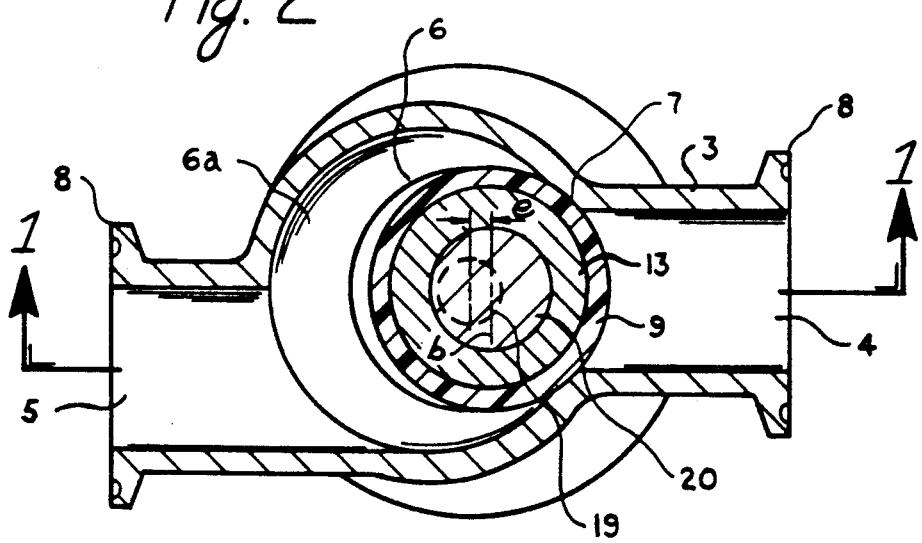
FIG. 2 is a horizontal, cross-sectional view of the device shown in FIG. 1 and following the line 2—2 in FIG. 1, and where the valve is shown in the closed position.

Referring specifically to FIG. 1, here we see stem 19 in the open position, that is, the cylindrical portion 20 is displaced all the way towards outlet port 5 thereby forcing the barrel-shaped element 13 towards outlet port 5 (position a). This in turn will lead to an eccentric, radial displacement of the flexible sleeve 9 which will allow fluid from inlet port 4 to flow between sealing surface 7 and flexible sleeve 9 into body opening 6a and from there to outlet port 5. This is the open valve position. Upon rotation of the valve stem 19 in the opposite direction, which in turn forces barrel-shaped element 13 to move towards the inlet port 4, this forces flexible sleeve 9 to make a nutating motion and engages sealing surface 7 of housing 3 to block flow of fluid flow from inlet port 4 to outlet port 5. This will happen when the eccentric distance "e" is relocated as shown in FIG. 2 (position b).

It is necessary to drain the valve opening 6a completely whenever such a valve is used for a sanitary fluid (such as in the food or bioprocessing industry). My invention can accomplish this by placing the valve so that the stem 19 is in the horizontal axis and by placing the axis of outlet port 5 offset from that of inlet port 4 (see FIG. 2). In this way, the inner surface of port 5 is flush or slightly below the extreme radial disposition of the enlarged mid-section 6a. Thus, following the laws of gravity, all the fluid will drain from the valve housing into the piping attached to outlet port 5.

Numerous modifications can be made to the invention without departing from the spirit of the following claims; for example, portion 20 might have additional bearing means to reduce rotating friction; a valve packing could be added around stem 19 for added protection; a separate seat ring (for example, made from stainless steel) could be added in housing 3 if the latter is made from an inexpensive metal such as cast iron; the shaft itself could be retained in an eccentric relationship towards the axis of bore 6; the non-displaced portion of the sleeve length could be completely retained within the housing bore itself; additional parts can be added, and so on.

Having thus described a typical embodiment, I hereby claim the following features of my invention:

1. Eccentrically Rotatable Sleeve Valve, comprising a housing having at least one inlet port and outlet port and one central opening having an enlarged mid-section and extending essentially perpendicular to said inlet port, the interface between said inlet port and the perpendicular central opening constituting a valve seat, a flexible sleeve inserted within the central opening, a cylindrical core snugly fitting within said flexible sleeve and extending in width beyond the cross-sectional dimension of said inlet port, a shaft extending through the length of said central opening and having an eccentric element, said core having a bore cooperatively engaging with the shaft and having suitable configured portions to engage said eccentric element of the shaft and capable of causing the lateral displacement of said core toward said inlet port thereby forcing the central portion of said flexible sleeve to make a complimentary motion and thereby causing the sleeve to contact the valve seat to close off and prevent fluid from flowing from the inlet to the outlet port upon sufficient rotational displacement of said shaft, and suitable closure means attached to either terminating end of said central opening, additional inserts having tapered exterior surfaces engaging within the upper and lower portion of said sleeve and straddling said core, deformable wedge elements dispersed between said tapered exterior surfaces of the inserts and the interior surface of said sleeve, and means to compress said deformable wedge elements.

2. Eccentrically Rotatable Sleeve Valve of claim 1, wherein said eccentric element of the shaft is comprised of a cylindrical central portion extending in diameter over that of said shaft and where the centerline of said cylindrical portion is off-set from that of the shaft.

3. Eccentrically Rotatable Sleeve Valve of claim 1, wherein each of said closure means is comprised of a flange suitably attached to said valve housing and having a circular opening to snugly engage the upper or lower outer extremity of the flexible sleeve.

4. Eccentrically Rotatable Sleeve Valve of claim 1, where the outlet port of said housing is eccentrically displaced from the center of said inlet port so that the lower interior surface of said outlet port is flush with the inside radial surface of said enlarged mid-section of said central opening of the housing in order to provide drainage for the fluid remaining in the valve housing after the valve is closed.

5. Eccentrically Rotatable Sleeve Valve of claim 1, where said inserts have or cooperate with threaded means to cause, in conjunction with said closure means, to compress said deformable wedge elements in order to exert radially outward forces on the sleeve interior in order to provide a tight seal between the sleeve exterior and portions of the inner surfaces of the central opening.

6. Eccentrically Rotatable Sleeve Valve of claim 5, wherein elastic springs are placed between said threaded means and the closure means in order to maintain tension on said threaded means following thermal distortion on said sleeve or wedge means.

* * * * *